Dec. 3, 1940.  F. C. MARTIN  2,223,378
DEFLECTOR FOR WINDSHIELDS
Filed Jan. 15, 1940

Inventor
Floyd C. Martin

By Clarence A. O'Brien
and Hyman Berman
Attorneys

Patented Dec. 3, 1940

2,223,378

UNITED STATES PATENT OFFICE 2,223,378

DEFLECTOR FOR WINDSHIELDS

Floyd C. Martin, Jamestown, N. Y., assignor to Lillian A. Martin, Jamestown, N. Y.

Application January 15, 1940, Serial No. 313,996

3 Claims. (Cl. 296—91)

My invention relates to deflectors for automobile windshields and the principal object in view is to provide an efficient, simply constructed device for ready attachment to present-day automobiles and adapted, under travel of the automobile, to divert insects, mist, dust, and the like, away from the windshield so as to prevent the same from collecting thereon, whereby the windshield may be maintained in a condition for clear vision therethrough.

To the accomplishment of the above, and subordinate objects presently appearing, a preferred embodiment of my invention has been illustrated in the accompanying drawing, set forth in detail in the succeeding description, and defined in the claims appended hereto.

Figure 1:
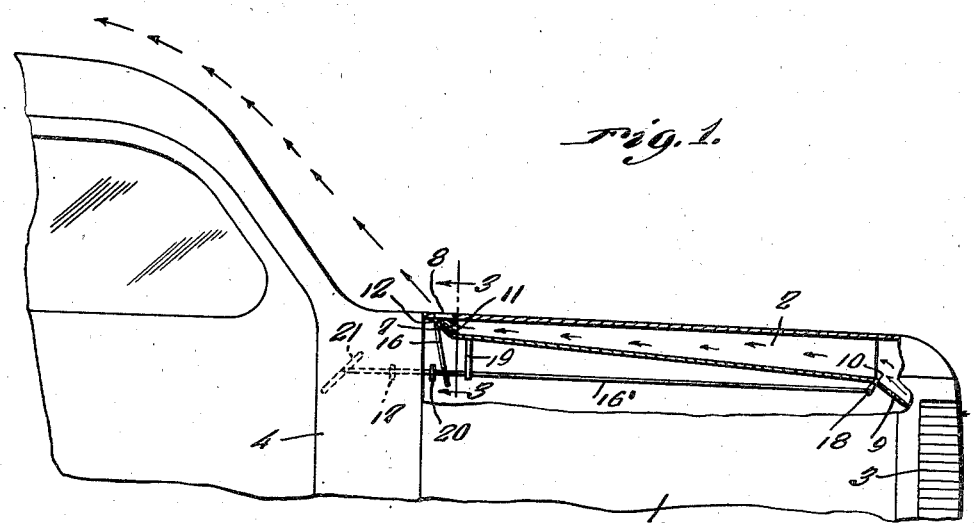
Figure 2:
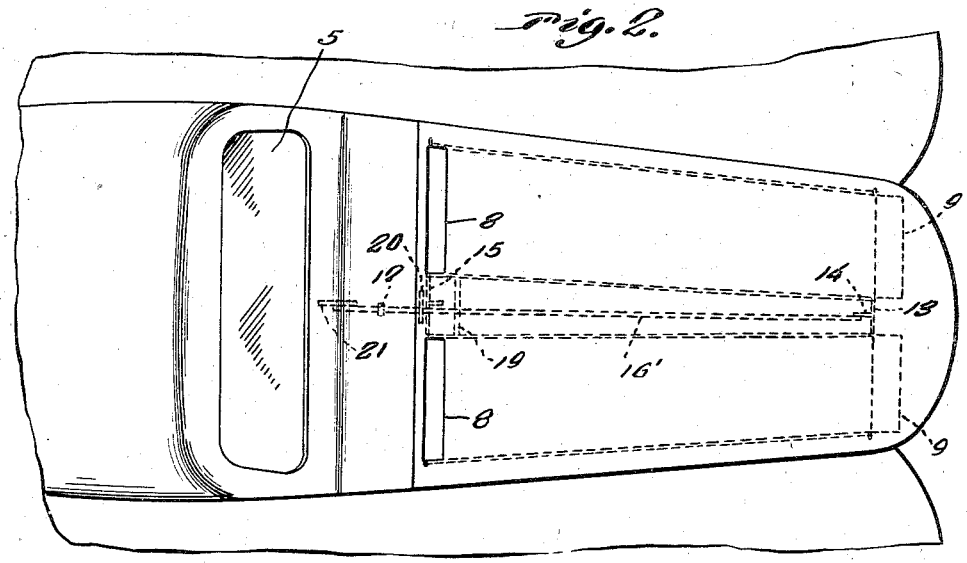
Figure 3:
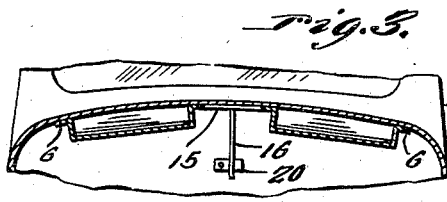

In said drawing:

Figure 1 is a view partly in side elevation and partly in longitudinal section illustrating the preferred embodiment of my invention, Figure 2 is a view in top plan, Figure 3 is a view in transverse section taken on the line 3—3 of Figure 1 looking in the direction indicated by the arrows.

Referring to the drawing by numerals, according to my invention, the hood 1 of the automobile is equipped, on the under side thereof, with, preferably, a pair of duplex air conducting and collecting conduits 2 extending lengthwise of the hood upon opposite sides of the longitudinal center thereof, respectively, in closely spaced, substantially parallel relation, from points closely adjacent to the radiator grill 3 to points within a short distance of the cowl 4. The conduits 2 are designed, as regards width, so that, at the cowl 4, their outer sides align with the sides of the windshield 5. Conduits 2 are preferably of trough-like form with straight sides, open front ends, and right angled side edge flanges 6 by means of which they are suitably secured to the under face of the hood 1, for instance, as by welding, not shown, and said conduits gradually decrease in depth rearwardly. At the rear ends thereof said conduits 2 are provided with upwardly and rearwardly inclined rear walls 7 extending to the rear edge of a pair of air outlet slots 8 provided in the hood 1 and extending across said conduits, respectively.

A pair of closure flaps 9 are hinged, as at 10, to the front ends of the conduits 2, respectively, for upward swinging movement to close the same. A similar pair of flaps 11 are similarly hinged, as at 12, to the upper edge of the rear walls 7, respectively, to close the slots 8. The pair of flaps 9 are connected intermediate the conduits 2 by a cross rod 13 equipped with a depending crank arm 14. A similar cross rod 15 connects the flaps 11 intermediate said conduits 2, said rod also having a depending crank arm 16.

A flap operating rod 16' is slidably mounted at its rear end in a bracket 17 beneath the cowl 4 to extend forwardly beneath the conduits 2 and with the front end pivotally connected, as at 18, to the crank arm 14. A guide 19 depends from the conduits 2 and through which said rod 16' is slidably extended. A pick-up connection between the rod 16' and crank arm 16 is provided in the form of a finger 20, the arrangement being such that under forward movement of the rod 16', in the open position of the flaps 9, 11, said rod first acts to close the flaps 9 and then to engage the crank arm 16 and close the flaps 11, this being a compensating provision for effecting simultaneous closing of the flaps 9, 11, the flaps 11 being larger than the flaps 9 and having a greater arc of closing movement.

A hand lever 21 is suitably mounted in the cowl 4 and connected to the rod 16 for manual operation of said rod.

The operation of the described invention will be readily understood. The flaps 9, 11, being open, under forward travel of the automobile, air is picked up by the conduits 2 through the grill 3, said conduits acting as scoops and the air being forced therethrough and upwardly through the slots 8 past the windshield 5 directly in front of the latter. Thus a wall of upwardly and swiftly traveling air is provided directly in front of the windshield acting to blow insects, mist, and dust upwardly past the same so that the usual collection on the windshield is prevented. The conduits 2 gradually decreasing in depth rearwardly provide for pressure being built up in the conduits so that the air is blasted out of the slots 8.

By manipulating the rod 16' to vary the position of the flaps 9, 11, the intake and discharge of air may be varied as desired.

The foregoing will, it is believed, suffice to impart a clear understanding of my invention, without further explanation.

Manifestly the invention, as described, is susceptible of modification without departing from the inventive concept, and right is herein reserved to such modifications as fall within the scope of the subjoined claims.

What I claim is:

1. The combination with the hood, grill, and windshield of an automobile of means to deflect matter away from said windshield under forward travel of the automobile comprising a pair of air collecting and discharging conduits in said hood extending lengthwise of the same upon opposite sides of the longitudinal center thereof, respectively, in side by side contiguous relation and having open front ends adjacent to said grill to scoop up air entering the grill, and rear ends opening upwardly through said hood immediately in front of said windshield, front and rear end closure flaps hingedly mounted on said conduits for opening and closing movement, a flap operating rod mounted in said hood for endwise sliding movement and projecting into the body of the automobile, and operating connections between said rod and flaps.

2. The combination with the hood, grill, and windshield of an automobile of means to deflect matter away from said windshield under forward travel of the automobile comprising a pair of air collecting and discharging conduits in said hood extending lengthwise of the same upon opposite sides of the longitudinal center thereof, respectively, in side-by-side contiguous relation and having open front ends adjacent to said grill to scoop up air entering the grill, and rear ends opening upwardly through said hood immediately in front of said windshield, front and rear end closure flaps hingedly mounted on said conduits for opening and closing movement, a flap operating rod mounted in said hood for endwise sliding movement and projecting into the body of the automobile, and operating connections between said rod and flaps, said conduits gradually decreasing in depth rearwardly to provide for building up air pressure therein.

3. The combination with the hood, grill, and windshield of an automobile of means to deflect matter away from said windshield under forward travel of the automobile comprising a pair of air collecting and discharging conduits in said hood extending lengthwise of the same upon opposite sides of the longitudinal center thereof, respectively, in side-by-side contiguous relation and having open front ends adjacent to said grill to scoop up air entering the grill, and rear ends opening upwardly through said hood immediately in front of said windshield, front and rear closure flaps hingedly mounted on said conduits for opening and closing movement, a flap operating rod mounted in said hood for endwise sliding movement and projecting into the body of the automobile, and operating connections between said rod and flaps, said conduits gradually decreasing in depth rearwardly to provide for building up air pressure therein, said connections including a pick-up connection for delaying closing operation of the rear pair of flaps until the front pair are partly closed.

FLOYD C. MARTIN.